US005432858A

United States Patent [19]

Clair, Jr. et al.

[11] Patent Number: 5,432,858

[45] Date of Patent: Jul. 11, 1995

[54] ENHANCED CONCERT AUDIO SYSTEM

[75] Inventors: Roy B. Clair, Jr., Lititz; Ronald D. Borthwick, Manheim, both of Pa.

[73] Assignee: Clair Bros. Audio Enterprises, Inc., Lititz, Pa.

[21] Appl. No.: 213,136

[22] Filed: Mar. 15, 1994

Related U.S. Application Data

[63] Continuation of Ser. No. 922,448, Jul. 30, 1992, abandoned.

[51] Int. Cl.$^{6}$ .......................... H04B 3/00; H04B 5/00

[52] U.S. Cl. .......................................... 381/82; 381/79

[58] Field of Search ......................... 381/79, 80, 77, 82

[56] References Cited

U.S. PATENT DOCUMENTS

| | | | |
|---|---|---|---|
| 2,567,431 | 9/1951 | Halstead . | |
| 3,235,804 | 2/1966 | McIntosh . | |
| 4,165,487 | 8/1979 | Corderman . | |
| 4,610,024 | 9/1986 | Schulhof | 381/103 |
| 4,618,987 | 10/1986 | Steinke et al. . | |
| 4,829,500 | 5/1989 | Saunders . | |
| 4,899,388 | 2/1990 | Mlodzikowski | 381/77 |
| 4,993,074 | 2/1991 | Carroll | 381/187 |
| 5,058,169 | 10/1991 | Temmer . | |
| 5,131,051 | 7/1992 | Kishinaga et al. | 381/82 |

FOREIGN PATENT DOCUMENTS

| | | |
|---|---|---|
| 2006116 | 12/1969 | France . |
| 55-077295 | 6/1980 | Japan . |
| 57-202138 | 12/1982 | Japan . |
| WO92/056-73A1 | 4/1992 | WIPO . |

OTHER PUBLICATIONS

Popescu, Dan, "Sound Reinforcement Systems in Early Danish Churches," *Journal of Audio Engineering Society*, vol. 28, No. 10, pp. 713-717 (Oct., 1980).

*Primary Examiner*—Curtis Kuntz
*Assistant Examiner*—Ping W. Lee
*Attorney, Agent, or Firm*—Burns, Doane, Swecker & Mathis

[57] ABSTRACT

A audio enhancement system and method of use with a sound system for producing primary sound from at least one main loudspeaker located at a main position. The audio enhancement system comprises at least one wireless transmitter, time delay circuitry, and plural augmented sound producing subsystems. Each sound subsystem is a portable unit arranged to be carried by a person located remote from the main loudspeaker and includes a wireless receiver and an associated transduce device, e.g., a pair of stereo headphones. The transmitter broadcasts an electrical signal which is representative of the electrical input signal provided to the main loudspeaker. The broadcast signal is received by the receiver and is demodulated and amplified to drive the transducer so that it produces augmented sound substantially in synchronism with the sound arriving from the main loudspeaker. To achieve that end the time delay circuitry delays the electrical signal which is provided to the transducer for a predetermined period of time corresponding generally to the time period it takes for the primary sound to propagate through the air from the main loudspeaker to the remote location at which the person is located.

8 Claims, 4 Drawing Sheets

ENHANCED CONCERT AUDIO SYSTEM

BACKGROUND OF THE INVENTION

This application is a Continuation of U.S. application Ser. No. 07/922,448, filed on Jul. 30, 1992, now abandoned, entitled Enhanced Concert Audio System, which is assigned to the same assignee as this invention and whose disclosure is incorporated by reference herein.

The present invention generally relates to audio systems and more particularly to systems for enhancing the sound received by audiences located at varying distances from loudspeakers.

The current state of the art for sound production or sound supporting equipment used in concert halls or in other spaces entails the use of one or more main loudspeaker cluster locations. These are typically located near the physical location of the actual sound source or that of the virtual sound source. Unfortunately nature has provided some impediments for these types of sound systems. In this regard as the sound produced by the loudspeakers travel over distance, distortion of the frequency and time spectrum naturally occur. Also, non-linear type distortions are introduced due to the physics of the air compression and rare fractions by which the sound propagates. Moreover, since the perceived loudness and the sound pressure level decreases with increasing distance from the sound source, in order to achieve the desired sound pressure level (SPL) at remote listener positions substantially more sound pressure must be developed at the source. However, increasing the sound pressure level thereat produces more distortions. Thus, the larger the distance from the sound source to the audience the more acute the problem.

Persons attending concerts in large halls or arenas are becoming more demanding in their desires for high quality sound; they want to have the sound quality delivered to them by public address speaker systems approaching recording studio quality. This places a heavy burden on the large sound system designer. One common approach to achieve that end is utilize what has been referred to as "delayed speaker systems" in combination with the main loudspeaker system. In particular, additional loudspeakers are provided at remote locations so that they can be located closer to some of the audience than the main loudspeaker(s) or cluster(s). These fixed remote loudspeakers typically have their input signals delayed in time with respect to the signals provided to the main loudspeaker(s)/cluster(s) to synchronize their acoustic output with that arriving from the main loudspeaker(s) or cluster(s).

In an article appearing in the Journal Of The Audio Engineering Society, Vol. 28, No. 10, October 1980, entitled Sound Reinforcement Systems In Early Danish Churches, by Dan Popescu, there are disclosed distributed loudspeaker systems making use of remotely located loudspeakers and delay equipment to synchronize the amplified sound with the direct (e.g., live) sound.

Other approaches for delivering audio to persons within an auditorium are found in the following U.S. Pat. Nos. 2,567,431 (Halstead), 3,235,804 (Mcintosh), and 4,165,487 (Corderman).

While the foregoing approaches to sound enhancement have some aural benefits, they never the less still leave much to be desired from the standpoint of delivering very high quality sound to the remote listeners. Moreover, such systems can become relatively complex, unwieldy and inflexible.

Accordingly, a need exists for an audio enhancement system which overcomes the disadvantages of the prior art.

OBJECTS OF THE INVENTION

It is a general object of this invention to provide an audio enhancement system which overcomes the disadvantages of the prior art.

It is a further object of this invention to provide an audio enhancement system for providing augmented sound to persons located at remote distances from main loudspeaker(s) or cluster(s) so that the augmented sound is synchronized with the sound arriving from the main loudspeaker(s)/cluster(s).

It is still a further object of this invention to provide an audio enhancement system for providing augmented sound via personal transducers to persons located at remote distances from main loudspeaker(s)/cluster(s).

It is yet a further object of this invention to provide an audio enhancement system for providing augmented sound via portable equipment to persons using that equipment located at remote distances from main loudspeaker(s)/clusters(s).

It is yet a further object of this invention to provide an audio enhancement system for providing augmented sound via wireless transmission to portable equipment used by persons located at remote distances from main loudspeaker(s)/cluster(s).

SUMMARY OF THE INVENTION

These and other objects of this invention are achieved by providing an audio enhancement system and method of use with a sound system producing primary sound from at least one main loudspeaker located at a first position, The primary sound is produced by the main loudspeaker in response to an electrical input signal and is propagated through the air to remote locations, at least one of which is arranged to have a person thereat.

The audio enhancement system comprises transmitter means, time delay means, and augmented sound producing means. The transmitter means is arranged for effecting the wireless transmission of a transmission signal to the augmented sound producing means, The augmented sound producing means produces augmented sound at the remote location substantially in time synchronization with the primary sound arrival so that said person perceives the primary and augmented sounds in as a single enhanced sound arrival. The augmented sound producing means comprises receiver means for receiving the transmission signal and for providing an electrical signal in response thereto, and transducer means for converting the electrical signal into the augmented sound. The time delay means is arranged to effect the delay of the electrical signal to the transducer means for a predetermined period of time corresponding generally to the time period it takes for the primary sound to propagate through the air from the main loudspeaker to the remote location.

The method of this invention entails enhancing the sound provided to at least one person located at a first location remote from at least one main loudspeaker. The method comprises providing the person with a portable sound augmentation system comprising a transducer device for providing augmentation sound to that person, providing a main loudspeaker at a first position, providing an audio electrical signal from an audio source for producing primary sound from the loudspeaker in response thereto, and wirelessly transmitting a transmission signal corresponding to the audio electrical signal to the portable sound augmentation system, whereupon the sound augmentation system provides an output electrical signal to the transducer device to produce the augmentation sound at the remote location. The provision of the output electrical signal to the transducer device is delayed by the system for a predetermined period of time corresponding generally to the time period it takes for said primary sound to propagate to said remote location, whereupon said augmentation sound and said primary sound reach the ears of the person in substantial synchronism.

DESCRIPTION OF THE DRAWING

Other objects and many attendant features of this invention will become readily appreciated as the same becomes better understood by reference to the following detailed description when considered in connection with the accompanying drawing wherein.

DETAILED DESCRIPTION OF THE PREFERRED EMBODIMENT

Figure 1A:
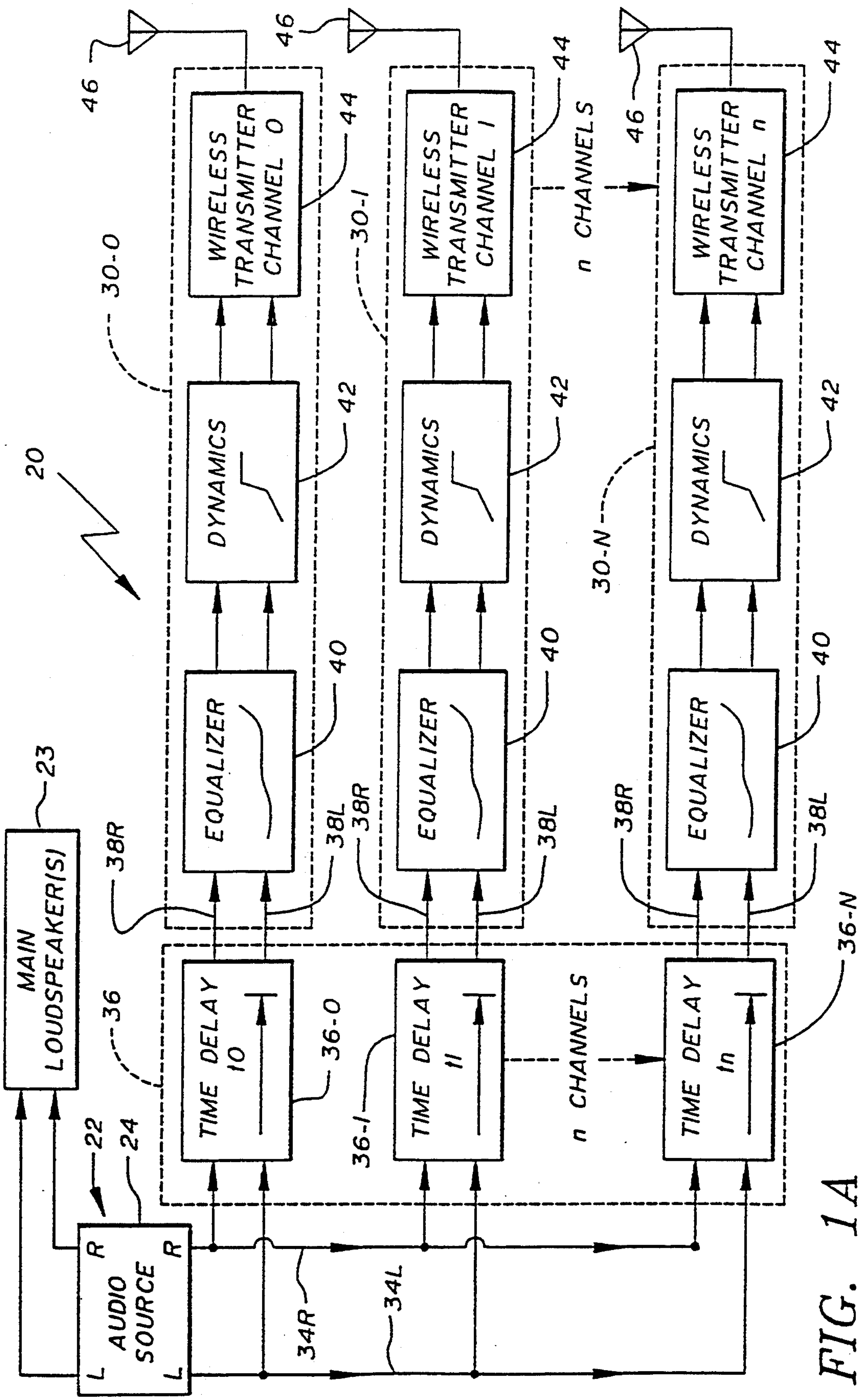
FIG. 1 is a block diagram showing one embodiment of the audio enhancement system of this invention.
Figure 1B:
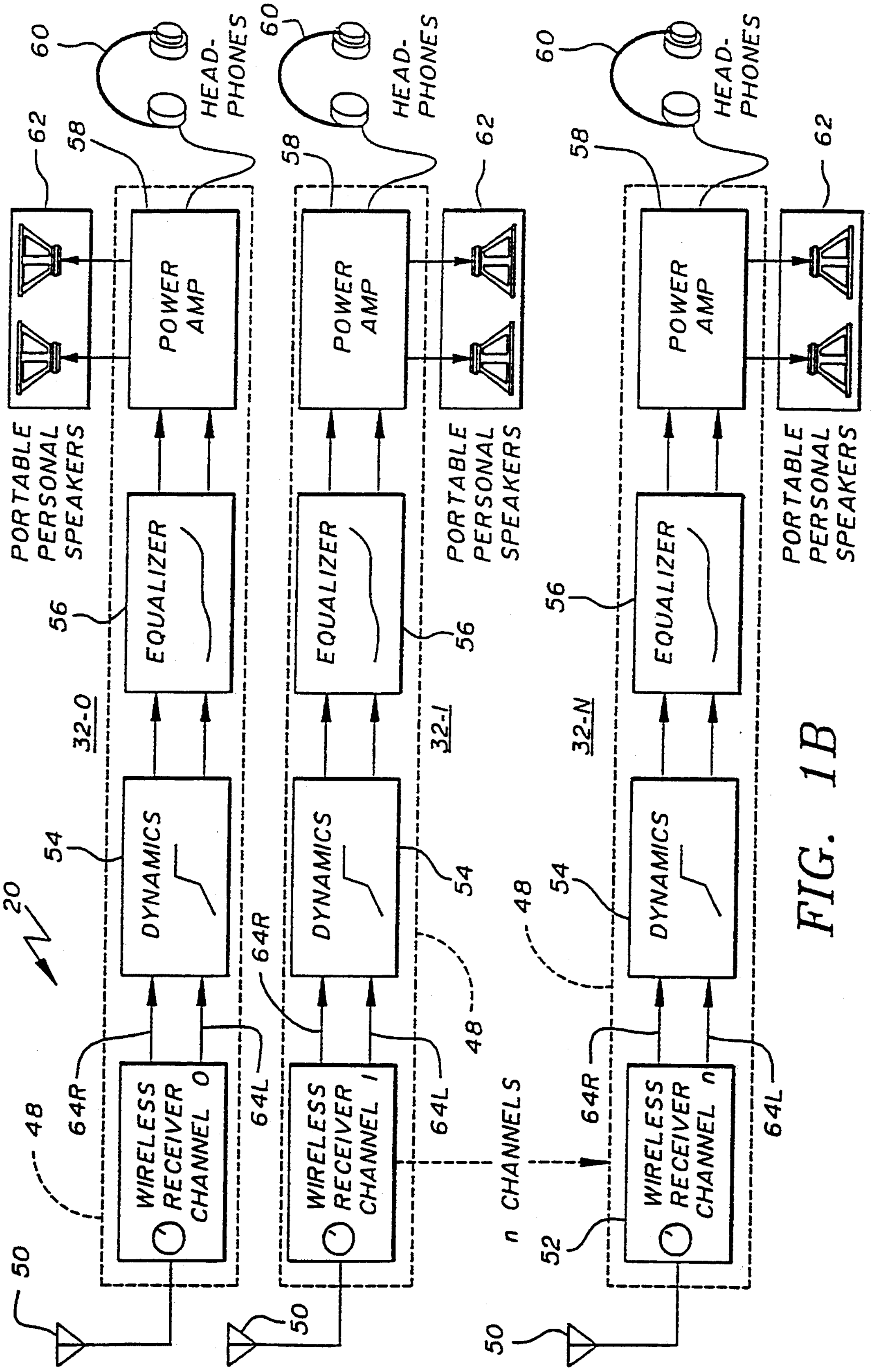

Referring now to various figures of the drawing wherein like reference numerals refer to like parts, there is shown at 20 in FIG. 1, one embodiment an audio enhancement system for use with a sound reproduction system 22. The sound reproduction system 22 can be any type of system having at least one main loudspeaker or at least one main cluster of loudspeakers 23 located at one position, e.g., a stage, for producing sound, e.g., music, in response to an electrical input signal provided by any suitable audio source 24, e.g., an electronic stereo amplifier. The main loudspeaker(s) or cluster(s) propagate the sound produced thereby through the air so that it may be heard by persons located at various positions, e.g, in plural rows of seats, located remote from the main loudspeaker(s) or clusters.

The audio enhancement systems of this invention serve to augment or enhance the sound heard by those persons by providing "augmentation sound" via personal transducer devices which are located adjacent, e.g., carried or worn, by those persons. To ensure that the augmentation sound enhances rather than degrades or confuses the "main" arriving sound, i.e., the sound arriving from the main loudspeaker(s) or cluster(s) the system of this invention is arranged so that the augmentation sound arrives at the listener's ears in time synchronism with the main arriving sound.

Figure 2:
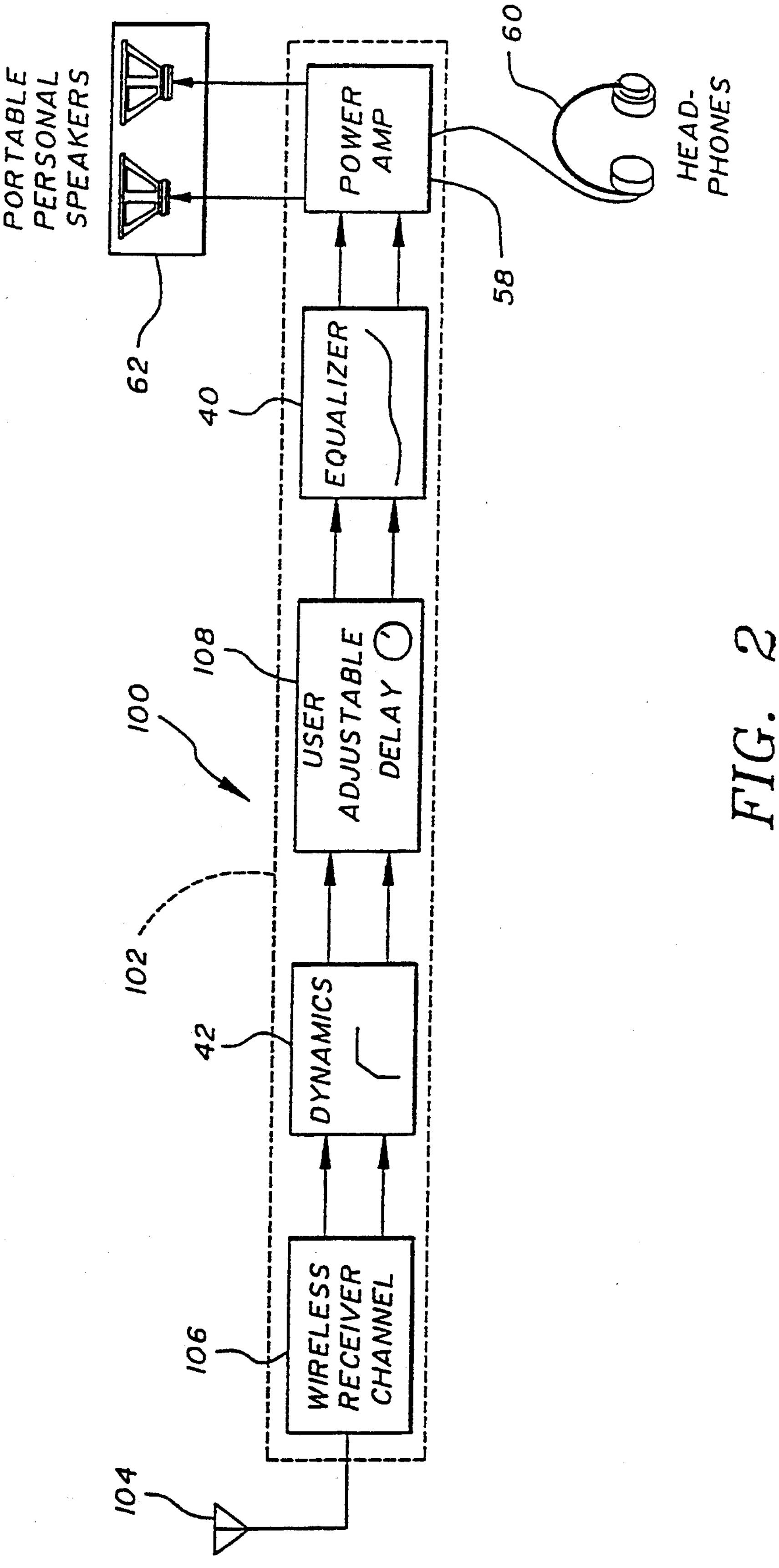
FIG. 2 is a block diagram showing a portion of a second embodiment of the audio enhancement system of this invention.
Figure 3:
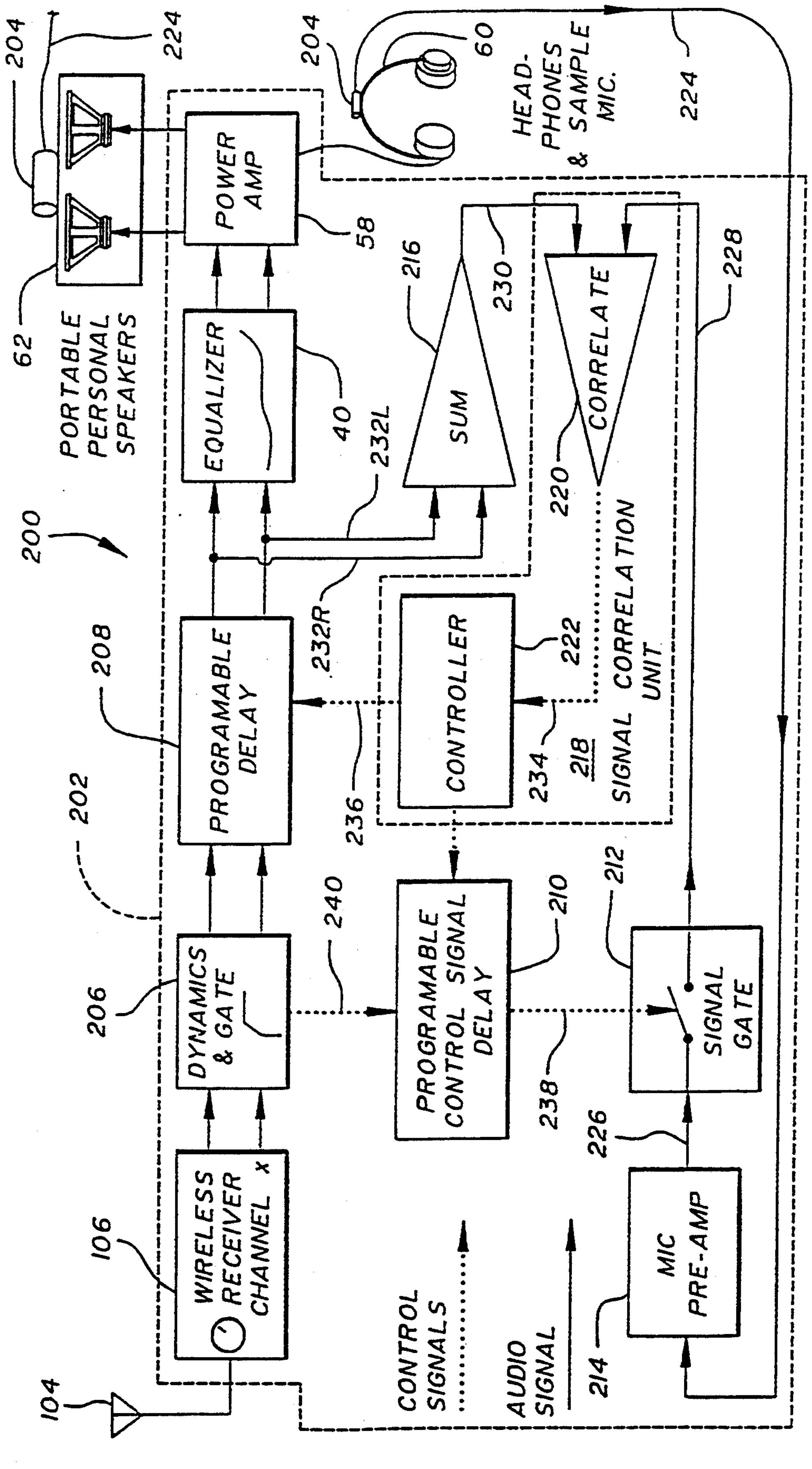
FIG. 3 is a block diagram showing a portion of a third embodiment of the audio enhancement system of this invention.

As will be appreciated by those skilled in the art from the descriptions to follow the implementation of audio enhancement systems in accordance with the teachings of this invention may take various configurations. Three such configurations or embodiments are shown and described herein. However, these embodiments are merely exemplary. Thus, other configurations may be constructed in accordance with the teachings of this invention. The three exemplary configurations or embodiments of this invention will be described in detail later. Suffice it for now to state that they comprise: a "zone" system shown in FIG. 1, a "manually synchronized" system, a portion of which is shown in FIG. 2, and a "self-synchronized" system, a portion of which is shown in FIG. 3.

Each of the embodiments of the audio enhancement basically comprises at least one transmitting subsystem and at least one remote receiver/transducer subsystem. Those subsystems will be described in detail later. Suffice it for now to state that each receiver/transducer subsystem basically comprises a receiver/amplifier compactly housed as a portable unit, and an associated portable transducer device, e.g., a pair of headphones, a portable speaker system, etc.

Each receiver/transducer subsystem is arranged to be located at any remote location inhabited by a listener so that it may receive electrical signals transmitted from the transmitting subsystem. The signals broadcast by the transmitter subsystem(s) represent(s) the signals provided by the audio source to the main loudspeaker(s) or cluster(s). The receiver/amplifier unit of the subsystem serves to receive the broadcast signals and to convert, process and amplify them into signals for driving the associated transducer device, e.g., headphones, to produce the augmentation sound in synchronism with the main arriving sound.

Moreover, as will be described in detail later and as mentioned earlier, each of the receiver/transducer subsystems of this invention preferably embodies the use of audio gear or equipment of the size normally used personally or by small groups. Thus, a relatively large number of such subsystems can be used for various types of sound enhancement applications.

In order to facilitate locating a receiver/transducer subsystem as near as possible to the listener, the electrical signal provided to it is preferably transmitted without wire. Thus, the systems make use of wireless transmitters in the transmitting subsystems (also to be described later) for broadcasting the audio signals to the plural remote receiving/transducing subsystems. Since wireless transmission also enjoys some degree of locational freedom, this feature of the audio enhancement system of this invention also allows the remote receiver/amplifier units and the associated transducer devices to be in the form of hand transportable equipment. In accordance with one preferred aspect of this invention the location of the remote receiver/amplifier unit and its associated transducer device is preferably made as close as possible to the listener, to thereby reduce to a minimum real world physical problems.

Referring now to FIG. 1 the "zone" audio augmentation system 20 will now be described. Before describing its details a brief overview of the system is in order. To that end the system of FIG. 1 is designed for applications wherein the audience is broken into discrete zones. Each zone encompasses a predefined physical area located a known distance from the main sound source, i.e., the main loudspeaker(s) or cluster(s). The system is designed so that each listener located within a given zone receives augmentation sound from his/her associated receiver/transducer subsystem delayed a predetermined time after the production of the main sound by the main sound source. Accordingly, the augmentation sound and the main sound arrive at the ears of each listener within that zone in substantial synchronism. In particular, the electrical signal that is destined for each zone is delayed, optionally processed (as will be described later), and transmitted on a discrete wireless channels to the receiver/transducer subsystems in the various zones. Audience members within each zone then tune their receiver to the appropriate channel for their zone to listen to the sound produced by the associated remote transducer(s) in substantial synchronism with the main arriving sound.

As will be appreciated by those skilled in the art since persons located within a given zone will necessarily be located at different distances from the main sound source there will inherently be some small time arrival errors between the main arriving sound and the augmentation sound for some persons within that zone. However, such errors can be minimized by providing as large a number of zones as is practical. In so doing one should be able to minimize, if not practically eliminate, sound arrival timing errors. Practically the number of zones will be determined by a trade off between allowable time arrival errors and the additional costs of more zones.

As shown in FIG. 1 the enhancement system 20 basically comprises a plurality of N dedicated transmitter subsystems, namely, 30-0, 30-1, and 30-N, and a plurality of respective, receiver/transducer subsystems 32-0, 32-1, and 32-N. These respective transmitter and receiver/transducer subsystems are coupled to each other via "N" transmission channels. In particular, each channel is arranged to carry the electrical signal representing the signal from the audio source 24, but delayed by a respective predetermined period of time with respect to the signal from the audio source 24. The amount of delay established is a function of the distance separating the main sound source from the associated remote zone so that the main sound and the augmentation sound arrive at the listener's ears substantially in synchronism. In the embodiment shown herein three of the N channels, namely, channels 0, 1, and N, are specifically shown. It should be understood that the number of channels in the system represents the number of zones to established in the arena or concert hall.

In order to delay the audio signals by the desired amounts for each of the N zones in the system the right (R) and left (L) outputs of the audio source 24 are provided by respective lines 34R and 34L to a plurality (N) time delay circuits 36-0, 36-1, and 36-N of a time delay unit 36. In a preferred embodiment of this invention the time delay unit 36 is a digital delay, e.g., such as that sold by T.C. Electronics as Model 1280DDL, but such is merely exemplary. Thus, any type of delay can be used.

Each of the time delay circuits delays the input signal provided to it by the predetermined period of time corresponding to the distance between the main sound source and the associated zone and provides the delayed signals via lines 38R and 38L to an associated transmitter subsystem. Thus, the output lines 38R and 38L from time delay circuit 36-0 are provided as inputs to the Channel 0 transmitter subsystem 30-0, the output lines 38R and 38L from time delay circuit 36-1 are provided as inputs to Channel 1 transmitter subsystem 30-1, and the output lines 38R and 38L from time delay circuit 36-N are provided as inputs to Channel N transmitter subsystem 30-N.

In accordance with a preferred aspect of this invention the respective delayed signals from the unit 36 are equalized (e.g., their audio frequency spectrum balanced) and dynamic level shaped (e.g., their "dynamics" established) by means forming a portion of each of the transmitter subsystems 30-0 to 30-N. Such means comprises an equalizer 40 of any suitable construction, such as a ⅓ octave equalizer sold by T.C. Electronics as Model 1128, and a signal dynamic processor, e.g., an expander, compressor, limiter, noise gate, etc., 42, but also of any suitable construction. It should be pointed out at this junction that the equalizer 40 and signal processor 42 are optional, and hence, one or both may be eliminated from the system 20.

The delayed signals in each transmission subsystem are provided to an associated wireless transmitter 44 therein for broadcast by an associated antenna 46 connected to the output of the transmitter. The wireless transmitter may be of any suitable construction for broadcasting a electrical signal carrying the audio information, i.e., the audio signal provided by the audio source 24. One exemplary wireless transmitter is that sold by Lectrosonics as the T-72 Auditory Transmitter. That device includes in it a signal dynamics processor and hence may also make up the signal processor 42.

In the embodiment of FIG. 1 each of the respective transmitter subsystems 30-0 to 30-N of the system 20 is arranged to broadcast its associated delayed signal at a different, preselected frequency for receipt by an associated group of receiver/transducer subsystems located within a predetermined zone in the arena or concert hall. In this regard, the transmitter subsystem 30-0 broadcasts its delayed audio signal at one predetermined frequency for receipt by the receiver/transducer subsystem(s) 32-0 tuned to that one frequency and located within a first zone in the concert hall, while the transmitter subsystem 30-1 broadcasts its delayed audio signal at a second predetermined frequency for receipt by the receiver/transducer subsystem(s) 32-0 tuned to that second frequency and located within a second zone in the concert hall, and while the transmitter subsystem 30-N broadcasts its delayed audio signal at an Nth predetermined frequency for receipt by the receiver/transducer subsystem(s) 32-N tuned to that Nth frequency and located within an Nth zone in the concert hall.

Each of the receiver/amplifier units forming a portion of the receiver/transducer subsystems 32-0 to 32-N is designated by the reference number 48 and is preferably housed as a compact, easily portable unit. Moreover, each unit 48 basically comprises an antenna 50, a wireless receiver 52, a signal dynamics processor 54, an equalizer 56, and a power amplifier 58. A portable electrical-to-acoustic transducer device is associated with each unit to complete the receiver/transducer subsystem. The transducer device may be any personal, and preferably readily portable unit, e.g., a set of conventional stereo headphones 60, a personal loudspeaker system 62, or any other suitable, small device, e.g., earpiece transducers (not shown).

The wireless receiver 52 of each receiver/amplifier unit 48 is of conventional construction and is arranged to be tuned to any of the preselected frequencies being broadcast by its associated transmitter subsystem. Thus, when the receiver is so tuned it takes the electrical signal received on that frequency and converts it to electrical output signals for driving the associated transducer device to replicate the sound produced by the main sound source.

In accordance with a preferred aspect of this invention each of the wireless receivers is arranged to be tuned to all of the frequencies being broadcast by the various transmitter subsystems. Thus, each receiver-/amplifier unit can be used in any zone by merely tuning its receiver to the frequency for that zone. To aid that tuning, each person attending a concert where the system 20 of this invention is in use could be given instructions to tune his/her receiver/amplifier unit 48 to a particular channel setting based on seat numbers or sections (the frequency of the transmission for that channel) so that the augmentation sound and the main arrival sound arrive at his/her ears substantially in synchronism.

Each receiver 52 includes a pair of output lines 64R and 64L which serve as the inputs to the associated signal processor 54. Each signal processor 54 is of any suitable construction to provide the appropriate level dynamics to the signals provided by the associated wireless receiver. The right and left outputs of the signal processor 54 are provided as inputs to the associated equalizer 56. Each equalizer 56 is also of any suitable construction to achieve any desired frequency response modification. The right and left outputs of the equalizer 56 are provided as inputs to an associated power amplifier 58. The power amplifier may be of any suitable construction for amplifying the input signals for provision to the transducer device 60 or 62 associated with the receiver/amplifier unit 48. The signal processor 54 and the equalizer 56 are each optional, and hence the receiver/amplifier unit 48 need not include either or both of them. In the later case the receiver/amplifier unit will merely comprise the wireless receiver and an associated power amplifier. One exemplary combined receiver, equalizer and amplifier is that sold by Lectrosonics as the PRS-72 Auditory Receiver.

As will be appreciated by those skilled in the art means for delaying the input signal from the audio source, and for processing and broadcasting of the delayed signal to the various receiver/amplifier units of the receiver/transducer subsystems 30-0 to 30-N may be achieved in different manners and using different means than that described above. For example, such actions can be achieved within a single device rather than multiple devices. Furthermore, the arrangement of the signal processing could be reordered. Thus, the system shown and described with reference to FIG. 1 only reflects one current method of providing multiple time-delayed audio signals for broadcast on particular channels.

The "manually synchronized" audio enhancement system will now be described with reference to FIG. 2. Only the receiver/transducer subsystem of that audio enhancement system is shown therein. This system is different than the system of 20 of FIG. 1 in that it accomplishes synchronization of the main arrival sound and augmentation sound by the user of the receiver/amplifier unit manually adjusting time delay means (to be described later) in his/her unit. This adjustment establishes the necessary delay time of the electrical signal producing the augmentation sound with respect to the main signal provided by the audio source so that those sounds arrive in synchronism at the listener's ears. Thus, in the "manually synchronized" sound enhancement system embodying FIG. 2 the entire audience is covered by a single transmitter zone. In particular, the audio signal is broadcast over a single frequency by a common, single wireless transmitter (not shown in FIG. 2) to all of the receiver/transducer subsystems located throughout the various zones in the concert hall. That audio signal is provided from the audio source 24 described heretofore and may be processed by an equalizer and signal dynamics processor also like that described heretofore prior to transmission (broadcast).

Each of the receiver/transducer subsystems or units of the "manually synchronized" audio enhancement system is of identical construction as the others of that system. One exemplary construction of such a subsystem is designated by the reference number 100 in FIG. 2. Like the receiver/transducer subsystem of FIG. 1, the receiver/transducer subsystem 100 includes a receiver/amplifier unit 102 and an associated transducer device, each of which is a compactly housed portable unit suitable for easy carrying by a person.

The receiver/amplifier unit 102 basically comprises an antenna 104, a wireless receiver 106, a signal dynamics processor 42, a user adjustable time delay 108, an equalizer 40, and a power amplifier 58. The signal processor 42 and the equalizer 40 are constructed the same as and operate in the same manner as those described earlier with respect to system 20. Moreover, they are optional like in the system 20. The wireless receiver 106 is of any suitable construction and operates like wireless receiver 52 described heretofore except that it does not need to be tunable, i.e., it can be pretuned to the frequency of the wireless transmitter. The power amplifier 58 is constructed the same as and operates in the same manner as that described earlier with respect to system 20. The user adjustable time delay 108 can be of any suitable construction, e.g., analog or digital, to delay the input signal provided to it from the wireless receiver 106 by a selectable amount. To that end it includes manually operable means (not shown), e.g., a rotatable knob and associated components, for adjusting the amount of delay to be provided thereby. The adjustment may be in discrete steps or may be continuous. In either case the user of the unit 102 could be instructed to set the amount of delay to a predefined setting. That setting will have been predetermined to establish the appropriate amount of delay based on the distance of the user's seat from the main loudspeaker(s) or cluster(s). Alternatively, the user can be instructed to adjust the manually operable means of the delay 108 until the main sound and the augmented sound are in synchronism (this will be readily determinable by the fact that the perceived sound will appear best when the sounds are synchronized).

In FIG. 3 there is shown a receiver/transducer subsystem 200 forming a portion of the "self-synchronized" audio enhancement system of this invention. That system is like the "manually adjustable" system except that instead of requiring manual adjustment by the user the adjustment (synchronization of the augmentation sound and main sound) is accomplished automatically by components within the system. To that end each receiver/-transducer subsystem 200 includes a compact, portable receiver/amplifier unit 202, an associated portable transducer device, e.g., headphones 60, and a sampling microphone 204 mounted on the portable transducer device. The unit 202 includes means (to be described later) for automatically adjusting the delay time in response to sound picked up by the sampling microphone 204.

The receiver/amplifier unit 202 basically comprises a wireless receiver 106, a signal dynamics processor with a gating circuit 206, a programmable delay circuit 208, an equalizer 40, a power amplifier 58, a programmable control signal delay circuit 210, a signal gate 212, a microphone preamplifier 214, a summing circuit 216, and a signal correlation circuit 218. The signal correlation circuit 218 itself comprises a correlate circuit 220 and a controller 222.

The "signal processor" portion of the circuit 206 and the equalizer 40 are constructed the same as and operate in the same manner as that described earlier with respect to the signal dynamics processor and equalizer, respectively, of the audio enhancement system 20. Moreover, they are optional like in the system 20. In the implementation shown the "gate" portion of the circuit 206 is not optional. Its structure and operation will be described later. The wireless receiver 106 is of any suitable construction and operates like wireless receiver of the "manually synchronized" system described earlier. The power amplifier 58 is also constructed the same as and operates in the same manner as that described earlier with respect to system 20.

The programmable delay circuit 208 can be of any suitable construction, e.g., analog or digital, to delay the input signal provided to it from the signal processor portion of the circuit 206 in response to a control signal provided by the signal correlation unit 218. The signal correlation unit operates in response to sound received by the microphone 204 to adjust the delay, so that the augmented sound provided by the headphones will arrive at the user's ears in synchronism with main sound arriving from the main loudspeaker(s) or clusters(s). In this regard the microphone being located at the listening location, e.g., on the headphones 60 or speaker system 62, gathers local sound pressure and provides an electrical output signal via line 224 to the microphone preamplifier 214. The microphone signal, after suitable amplification by the preamplifier 214, is provided via a line 226 to one input of the gate 212. The gate 212 is arranged when closed, as will be described later, to provide the amplified microphone signal via line 228 to one input of the signal correlation unit 218. That signal correlation unit is also arranged to receive a signal via line 230 from the output of the summing circuit 216. The summing circuit is in turn arranged to receive the right and left delayed signals from the programmable delay circuit via lines 232R and 232L to sum them and provide the summed signal on line 230. The signal correlation circuit 218 utilizes its correlate circuit 220 to correlate the amplified microphone signal with the left and right sum of the delayed audio signal from the delay circuit to provide an output signal on line 234 to be used by the controller 222. The controller implements an algorithm to provide a control signal on line 236 to the programmable delay 208. This signal tunes the delay time to that which is appropriate for synchronizing the augmentation sound with the main arriving sound.

Since the microphone is located within the sound field of the main loudspeaker(s) or cluster(s) and will also inevitably be exposed to the background ambient noise for best operation the receiver/transducer subsystem 200 preferably includes some means to disable the microphone during periods of no transmission, e.g., to prevent the output signal from the microphone from being used to adjust the delay established by the programmable delay, when the microphone in not in the presence of the main arriving sound. This action effectively prevents local background noise, such as crowd noise, from affecting control of the system.

One approach for disabling the microphone is the heretofore identified signal gate 212 and the programmable control signal delay circuit 210. To that end the signal gate 212 includes a control input provided by line 238 from the control signal delay circuit 210. That circuit receives a control signal via line 240 from the "gate" portion of the signal processor and gate circuit 206. In particular, if the audio input signals received by the receiver 106 are not above a predetermined threshold the "gate" portion of the signal processor and gate circuit 206 provides a control signal indicative thereof to the programmable control signal delay circuit 210. That circuit in turn provides a gate control signal, via line 238, to the signal gate 212. This action causes the signal gate to open to prevent the amplified microphone signal on line 224 from being passed to the signal correlation circuit 218. Once the input signals to the gate portion of the signal processor and gate circuit 206 reach the threshold, such as occurs when there is an audio signal provided by the audio source to the main loudspeaker(s) or cluster(s), the output signal on line 240 will cause the programmable control signal delay circuit 210 to provide an enable signal on line 238. This action closes the gate 212 to enable the microphone to effect control of the amount of delay provided by the subsystem. Moreover, the sampled signal, i.e., the amplified microphone signal, will only be present at the input to the signal correlation unit for a short time before the main sound arrival at the listening location.

Hence using the actual program signal, this unit should, over time, dynamically acquire the desired delay time at the listening location. It should also be possible for it to track this delay time to any change in listening location. Alignment signal bursts could also be broadcast from the main signal source, the composition of which can be optimized for a fast acquisition of the required delay setting, rather than being part of the actual audio program.

It must be pointed out at this juncture that the signal correlation circuit, the summing circuit, and the programmable control signal delay circuit can be implemented in various ways, e.g., via discrete components or through by the use of a microprocessor with appropriate programming. Moreover, in the disclosed embodiment the signal correlation unit represents a electrical implementation of a mathematical function. The exact implementation and function can change as other technologies progress.

Without further elaboration the foregoing will so fully illustrate our invention that others may, by applying current or future knowledge, adapt the same for use under various conditions of service.

We claim:

1. An audio enhancement system comprising:

at least one main electro-acoustic transducer for generating a primary sound in response to a first electrical signal;

transmission means for converting said first electrical signal into a transmission signal and for wirelessly transmitting said transmission signal: and at least one personal electro-acoustic transducer unit, said at least one personal electro-acoustic transducer unit including at least one auxiliary electro-acoustic transducer having a low maximum output sound level, wherein said maximum output sound level can be heard by people only within a range of several feet of said electro-acoustic transducer in ambient sound, a receiver for receiving and converting said transmission signal into a second electrical signal, said at least one auxiliary electro-acoustic transducer generating an augmenting sound in response to said second electrical signal, and delay means for delaying said second electrical signal by a period of time, said delay means further comprising an automatic adjustment means for automatically adjusting said period of time such that said augmenting sound augments said primary sound to enhance audio perception by at least one user within said range of said auxiliary electro-acoustic transducer, wherein said automatic adjustment means includes detecting means for detecting an air propagated signal generated substantially at said at least one main electro-acoustic transducer and, in response to said detected signal, for automatically adjusting said period of delay to be substantially equal to an amount of time required for said primary sound to reach said personal unit.

2. An audio enhancement system according to claim 1, wherein said primary sound generated by said at least one main electro-acoustic transducer includes said air propagated signal.

3. An audio enhancement system according to claim 1, wherein said electro-acoustic transducer unit is portable.

4. A personal electro-acoustic transducer unit comprising:

at least one auxiliary electro-acoustic transducer having a low maximum output sound level, wherein said maximum output sound level can be heard by people only within a range of several feet of said electro-acoustic transducer in ambient sound;

a receiver for receiving and converting a wirelessly transmitted signal corresponding to a primary sound generated at a distance into an electrical signal, said at least one auxiliary electro-acoustic transducer generating an augmenting sound in response to said electrical signal; and delay means for delaying said electrical signal such that said augmenting sound augments said primary sound to enhance audio perception by at least one user within said range of said at least one auxiliary electro-acoustic transducer, wherein said delay means includes an automatic adjustment means for automatically adjusting said period of delay and wherein said automatic adjustment means includes detecting means for detecting an air propagated signal generated substantially at a location where said primary sound is generated and, in response to said detected signal, for automatically adjusting said period of delay to be substantially equal to an amount of time required for said primary sound to reach said personal unit.

5. A personal electro-acoustic transducer unit according to claim 4, wherein said primary sound includes said air propagated signal.

6. A personal electro-acoustic transducer unit according to claim 4, wherein said electro-acoustic transducer unit is portable.

7. A method of enhancing audio sound, said method comprising the steps of:

generating a primary sound in response to a first electrical signal;

converting said first electrical signal into a transmission signal;

wirelessly transmitting said transmission signal;

providing at least one personal electro-acoustic transducer unit, said at least one personal electro-acoustic transducer Unit including at least one auxiliary electro-acoustic transducer having a low maximum output sound level, wherein said maximum output sound level can be heard by people only within a range of several feet of said electro-acoustic transducer in ambient sound, and a receiver;

receiving and converting in said personal unit said transmission signal into a second electrical signal:

generating in said at least one auxiliary electro-acoustic transducer an augmenting sound in response to said second electrical signal; and delaying at least one of said first and said second electrical signals by a period of time substantially equal to an amount of time required for said primary sound to reach said at least one personal unit, such that said augmenting sound augments said primary sound to enhance audio perception by at least one user within said range of said at least one auxiliary electro-acoustic transducer, wherein said automatic adjustment means includes detecting means, said method including the further steps of:

detecting an air propagated signal generated substantially at a source of said primary sound; and, in response to said detected signal, automatically adjusting said period of delay to be substantially equal to an amount of time required for said primary sound to reach said personal unit.

8. An audio enhancement method according to claim 7, wherein said air propagated signal is included in said primary sound.

* * * * *